United States Patent
Bensberg et al.

(10) Patent No.: US 10,817,507 B2
(45) Date of Patent: Oct. 27, 2020

(54) DOCUMENT STORE EXPORT/IMPORT

(71) Applicant: SAP SE, Walldorf (DE)

(72) Inventors: Christian Bensberg, Heidelberg (DE); Steffen Geissinger, Wiesloch (DE)

(73) Assignee: SAP SE, Walldorf (DE)

( * ) Notice: Subject to any disclaimer, the term of this patent is extended or adjusted under 35 U.S.C. 154(b) by 289 days.

(21) Appl. No.: 15/969,124

(22) Filed: May 2, 2018

(65) Prior Publication Data

US 2019/0340278 A1 Nov. 7, 2019

(51) Int. Cl.
G06F 16/30 (2019.01)
G06F 7/08 (2006.01)
G06F 16/23 (2019.01)
G06F 16/13 (2019.01)
G06F 16/16 (2019.01)

(52) U.S. Cl.
CPC .......... *G06F 16/2379* (2019.01); *G06F 7/08* (2013.01); *G06F 16/13* (2019.01); *G06F 16/164* (2019.01)

(58) Field of Classification Search
CPC ....... G06F 7/08; G06F 16/2379; G06F 16/164
USPC ........................................................ 707/703
See application file for complete search history.

(56) References Cited

U.S. PATENT DOCUMENTS

2017/0329807 A1* 11/2017 Kaufmann ......... G01C 21/3667

OTHER PUBLICATIONS

Ora11g2Adm: Oracle® Database Administrator's Guide 11g Release 2 (11.2), May 2015 (Primary Author: Steve Fogel, Here after "Ora11g2Adm"). (Year: 2015).*
Ora8Backup: Oracle8™ Backup and Recovery Guide, Release 8.0 Dec. 1997 (Primary Authors: Connie Dialeris and Joyce Fee, Here after "Ora8 Backup"). (Year: 1997).*
Oracle7™ Server Utilities Release 7.3, 1996 (Primary Author: Primary Author: Jason Durbin). (Year: 1996).*

* cited by examiner

*Primary Examiner* — Kuen S Lu
(74) *Attorney, Agent, or Firm* — Buckley, Maschoff & Talwalkar LLC

(57) ABSTRACT

Provided are systems and methods to acquire a manifest data file and a binary copy of a document store slice log having a first filename and comprising a plurality of entries, each of the plurality of entries associated with a respective database transaction and a commit identifier, and the manifest data file indicating one or more data partitions and one or more slices of each of the one or more data partitions, acquire a partition log for one of the indicated one or more data partitions, the generated partition log comprising a log entry associated with a transaction to create a slice and including a second filename associated with the slice, sort the plurality of entries of the document store slice log based on their associated commit identifiers, change the commit identifiers of each of the plurality of entries to a same commit identifier, and store the sorted and changed entries in a second document store slice log having the second filename.

20 Claims, 10 Drawing Sheets

DOCUMENT STORE EXPORT/IMPORT

BACKGROUND

Relational databases generally store data in tables whose structures and interrelationships are defined by a database schema. Each row of a table is associated with a primary key, and the data of an instance of a particular object may be stored across several of such tables. In contrast, a document store stores "documents" including the metadata and the data of an object instance. Since the structure or semantics of the data of an object instance are determined from the metadata within the object instance (semi-structured data), every stored object instance may differ from every other object instance.

It may be desirable to export the data of a document store from a source system to a target system. The source system may store the data within separate files (e.g., partitions, logs, indices, dictionaries, etc.), each of which may have unique file identifiers and include artifact identifiers and commit timestamps. These identifiers and timestamps may conflict with or be otherwise incompatible with identifiers and timestamps used in the target system. Systems are desired to address the foregoing in order to facilitate the export of document store data from a source system to a target system.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

DETAILED DESCRIPTION

In the following description, specific details are set forth in order to provide a thorough understanding of some embodiments. It should be appreciated that various modifications to the embodiments will be clear to those skilled in the art, and the generic principles defined herein may be applied to other embodiments and applications without departing from the spirit and scope of the disclosure. Moreover, numerous details are set forth in the following description. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Figure 1:
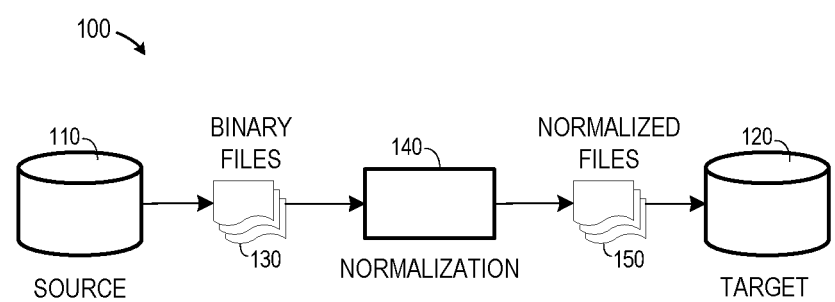
FIG. 1 is a block diagram illustrating export of data from a source document store and import of data by a target document store according to some embodiments.

Some embodiments operate to facilitate the export of document store data from a source system for import into a target system. FIG. 1 illustrates architecture 100 according to some embodiments. Architecture 100 includes source 110 and target 120, each of which may comprise a database system as is known in the art, and which supports a document store. Binary files 130 comprise files, or streams, of document store source 110 which include the data of source 110. As will be described in detail below, files 130 may include transaction logs, data slices, indices, dictionaries, etc.

According to some embodiments, binary files 130 are subjected to a normalization process by normalization component 140, resulting in normalized files 150. As will be described in detail below, normalization may include modifying file identifiers, commit timestamps and other artifacts of binary files 130 such that normalized files 150 are suited for import to target 120. For example, the filenames of binary files 130 may include a particular identifier associated with a collection (i.e., an artifact in which documents are stored) to which the files belong. If target 120 already uses this particular identifier, direct import of binary files 130 into target 120 will cause data inconsistencies. Similarly, binary files 130 include log entries with various commit IDs which are used to indicate whether data modified by an associated transaction is visible to other transactions. These commit IDs are not relevant within target 120. It is assumed that all data that has been committed in a collection in the source system shall be visible to all transactions in the target system after import.

Normalization may also include generating new files which are not present in binary files 130. Normalization component 140 may comprise any computing system executing program code to perform the processes described herein. Normalization may be performed by source 110 or target 120 in some embodiments.

Figure 2:
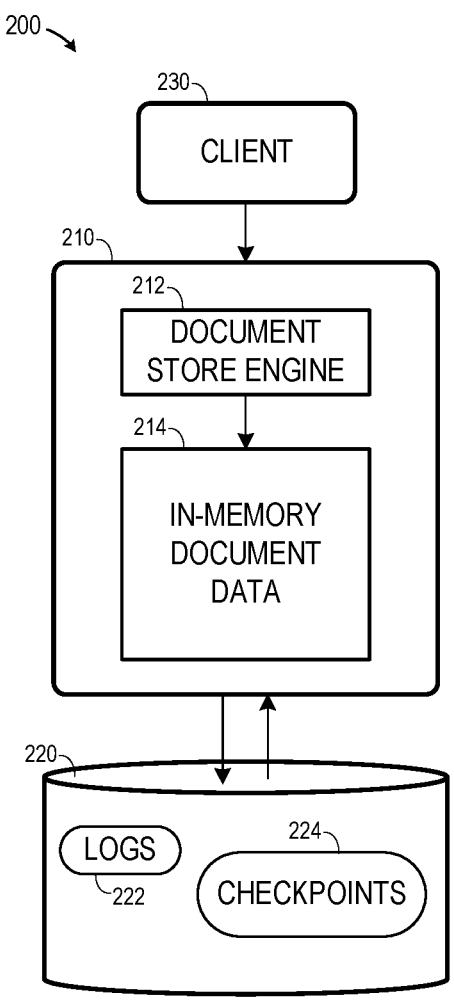
FIG. 2 is a block diagram illustrating a document store architecture according to some embodiments.

FIG. 2 illustrates database computing architecture 200 in accordance with some embodiments. Architecture 200 includes document store 210 and persistent memory 220. Document store 210 includes engine 212 for receiving requests from client 230 and responding thereto, and in-memory document data 214. Document store 210 may be implemented within one or more database server hardware systems including dynamic Random Access Memory (DRAM) or the like for storing in-memory document data 214, and persistent memory 220 may include any number of local and/or distributed non-volatile memory storage systems, including but not limited to hard disk drives, non-volatile Random Access Memory, and Flash memory.

For example, the document store 130 may store checkpoints to disk 140, in response to the system requesting a checkpoint operation. Also, the document store 130 may be reloaded based on checkpoint data stored in disk 140 after an implicit or explicit unload or in the event of a power loss or other failure.

Document store 210 and persistent memory 220 may be incorporated within a database system supporting different data stores such as a column store, a row store, and the like. As described herein, a store is a sub-system of a database which includes in-memory storage, as well as the components that manages that storage. For example, a row store may be a database row-based in-memory relational data engine. Meanwhile, a column store may store tables columnwise. In contrast, document store 210 may store documents in the form of collections. Document store 210 includes metadata defining collections, partitions, slices, relational tables, columns, views, indexes and procedures. The metadata may be stored in a single database catalog of document store 210.

Document store engine 212 may perform session management, authorization, transaction management and command processing. Client 230 may submit structured query language (SQL) and multidimensional expression (MDX) statements to engine 212 in the context of authenticated sessions and transactions. In response, the statements may be executed on data of document store 210 and/or other data stores.

Engine 212 also manages persistence between cached memory images of database objects, log files and permanent storage files. Like a traditional database, document store 210 performs page management and logging. According to some embodiments, changes made to in-memory data 214 may be persisted through logs 222 and checkpoints 224. All transactions committed in the database are memorialized in a log entry written to logs 222 of memory 220. Checkpoints 224 may be generated at desired times to reflect a current state of in-memory document data 214 and written to memory 220 as will be described below.

Figure 3:
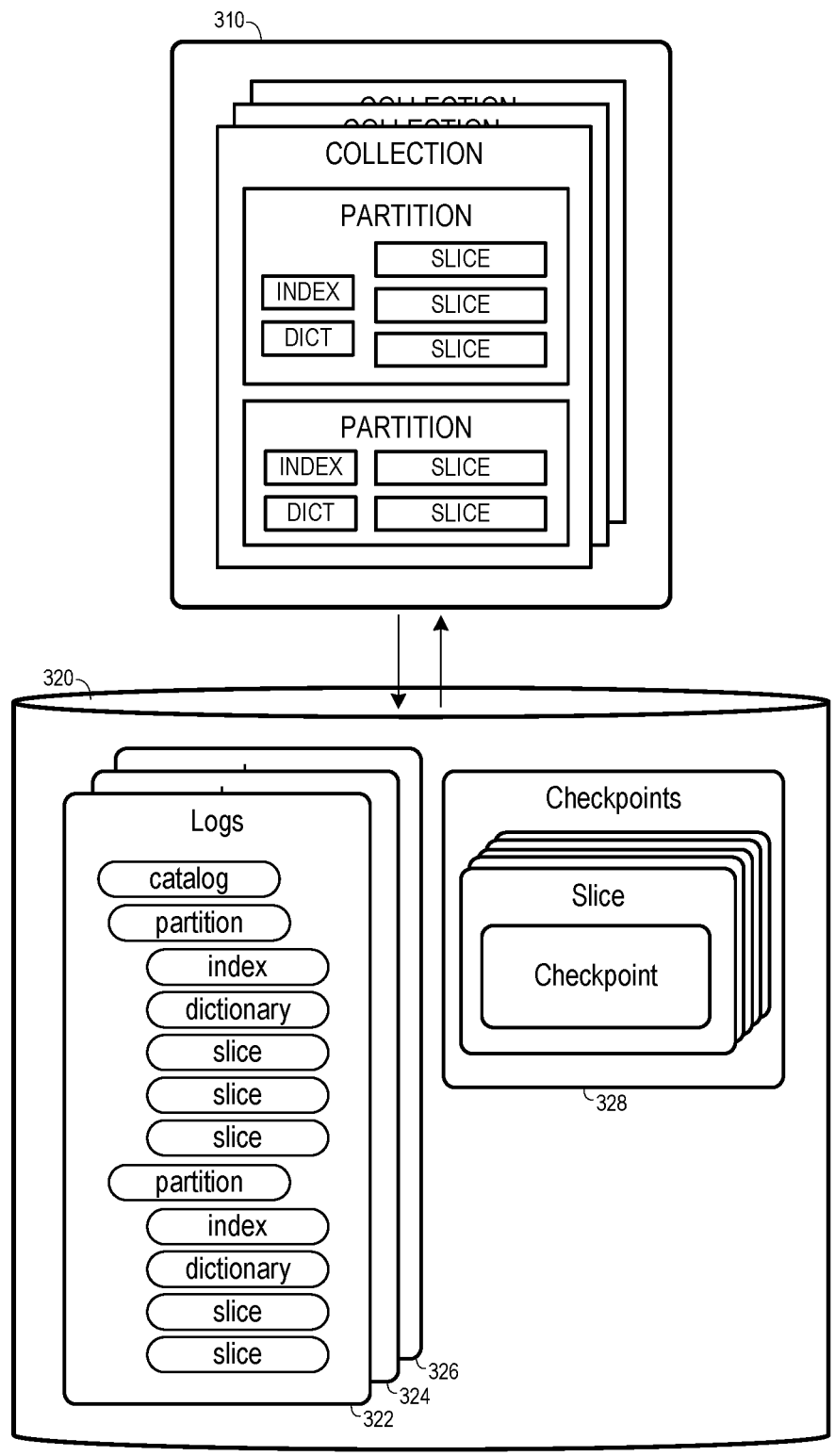
FIG. 3 is a block diagram illustrating memory artifacts and files within a document store architecture according to some embodiments.

FIG. 3 illustrates in-memory document data 310 and persistent memory 320 according to some embodiments. As shown, in-memory document data 310 includes one or more collections. Each collection may include one or more partitions, and each partition may in turn include one or more slices. Each slice consists of one or more documents, which may be represented in JavaScript Object Notation (JSON) format. A partition may include a dictionary as is known in the art, as well as one or more indices.

Persistent memory 320 stores logs 322-326 and checkpoints 328 according to some embodiments. The logs include entries describing every transaction that occurs on data 310, as well as identifiers representing an order in which the transactions occurred. The logs of memory 320 are depicted as organized by collection, but embodiments are not limited thereto.

Logs 322 correspond to the depicted collection of in-memory document data 310. Specifically, a catalog log corresponds to the collection, and a partition log exists for each of the two partitions of the collection. Each partition log is associated with an index log and a dictionary log. One of the partitions is associated with three slice logs respectively corresponding to the three slices of the partition, and the other partition is associated with two slice logs respectively corresponding to the two slices of the other partition. Each slice log is modified by the database as transactions occur on the respective slice.

Since the entries of logs 322 describe every transaction which occurred on the collection, the collection may be recreated based solely on the entries. In particular, the collection may be re-created (e.g., after a power failure) by re-executing each transaction described in logs 322. Since this re-creation would consume a significant amount of time and resources, the document store also operates to store checkpoints 328 in persistent memory 320.

Checkpoints 328 includes checkpoints for one or more of the slices stored within document data 310. Each time a checkpoint request is received, the system may store a current copy of the slice and truncate the log file corresponding to the slice. A checkpoint includes a copy of the documents of a slice stored within a memory block of document data 310 at a particular time. The log file associated with a slice is truncated at the time of a checkpoint to include entries for transactions which are associated with documents of the slice but which are not yet fully visible or not yet included in the checkpoint for timing reasons. Writing a checkpoint for a slice overwrites any previously-created and potentially-existing checkpoints for the slice.

Figure 4:
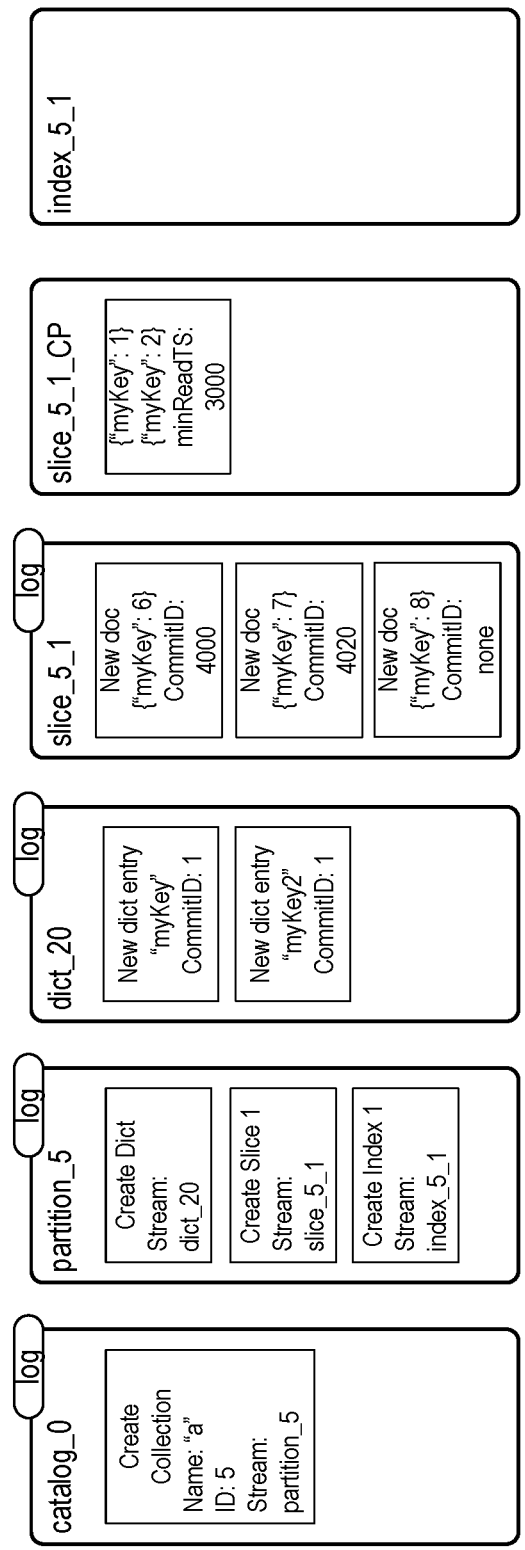
FIG. 4 represents files of a source document store according to some embodiments.

FIG. 4 illustrates persisted files of a source document store according to an example. The files include a catalog log, a partition log, a dictionary log, a slice log, a checkpoint copy of a slice, a trimmed checkpoint log, and an index log.

The catalog log is associated with the entire source document store. The catalog log includes an entry which logs a transaction requesting creation of a collection in memory. The entry specifies a name of the collection (i.e., "a"), an identifier of the collection (i.e., "5") and a stream name associated with the collection's sole partition (i.e., "partition_5"). Embodiments are not limited to collections including a single partition. The catalog log may include entries which log other transactions such as creation, update or deletion of one or more other collections.

The partition log is associated with partition_5 and includes entries of transactions to create a dictionary, a slice and an index for the partition, respectively. The entries specify stream names for each of the dictionary, the slice and the index. Partitions are not limited to a single slice according to some embodiments. Similarly, partitions are not limited to a single index, and may include no indices, in some embodiments.

The dictionary log is named as specified in the corresponding entry of the partition log, and includes two entries. The entries describe creation of two dictionary keys, myKey and myKey2. The entries also include commit IDs of "1" because these entries should be visible to all pending and future transactions.

The log associated with slice 5_1 may include entries associated with transactions requesting the creation, update or deletion of documents of the slice. Entries corresponding to committed transactions are assigned commit IDs, while entries of non-committed transactions include no commit ID. As described above, a partition may include any number of slices, each of which will be associated with a dedicated log file.

Checkpoint files associated with a slice are named based on the stream name of the slice (e.g., slice_5_1_CP). As described above, the checkpoint files may include a file of documents at a given point in time. During writing of a checkpoint, the log file is truncated to remove entries for transactions received after the commission of a latest fully system-visible document but before creation of the checkpoint. Finally, the index log file is assumed to have been created in response to the corresponding transaction reflected in the partition log. However, the index log file in the present example is empty as no index-related transactions have been received.

A description of commit IDs and read timestamps now follows. Generally, database transactions are received over time. Each transaction is assigned a timestamp referred to herein as a read timestamp. The read timestamp may be an incremental counter value received from a transaction manager or other program executing on the database. In addition to the read timestamp, the transaction is assigned a commit identifier when the transaction is subsequently committed to the database. The database may be structured such that a read operation of a next transaction is assigned a read timestamp equal to a commit ID of the transaction that was most recently committed to the database. A transaction manager may maintain the current commit ID and a current read timestamp.

A previous transaction is visible to a current transaction if the previous transaction was committed before the start of the current transaction (assuming transaction isolation). Accordingly, the prior transactions visible to a current transaction are determined based on the commit IDs associated with prior transactions and the read timestamp of the current transaction. Specifically, all transactions assigned a commit ID that is equal to or less than a read timestamp of a current transaction are visible to the current transaction.

The database may receive a request to create a checkpoint at a given time. The checkpoint may be assigned an identifier which is equal to a commit ID of the most-recent fully visible transaction. This identifier is referred to herein as the minimum read timestamp of the checkpoint. When the checkpoint is created with a given Commit ID timestamp, the log file is truncated so that only these entries remain that have a higher Commit ID. Accordingly, when reloading data, the checkpoint file and the truncated log file include all of the data.

Figure 5:
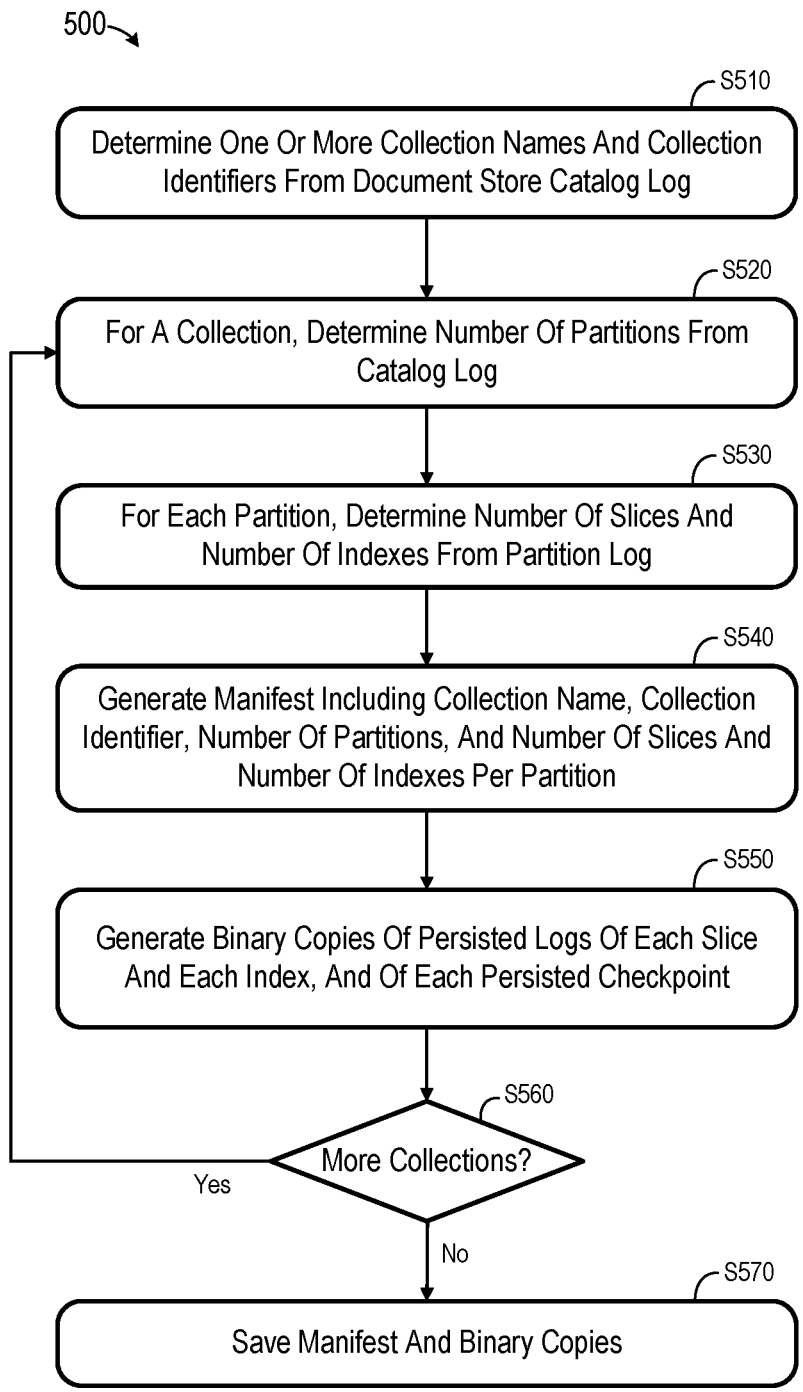
FIG. 5 is a flow diagram of a process to export files of a source document store according to some embodiments.

FIG. 5 illustrates process 500 for exporting a document store according to some embodiments. Process 500 may be performed by a database node included within a distributed database system, including but not limited to one or more computing devices such as a server, a cloud platform, a computer, and user device. Process 500 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 500 may be initiated by a database administrator. According to some embodiments, a database administrator submits an instruction to export a document store prior to process 500. In response, files from persistence are read with a constant read timestamp. While these files are read, incoming transactions are allowed and may modify the files of the document store. These modifications are not visible to the transaction that performs the export.

Initially, at S510, names and identifiers of one or more collections of the document store are determined. The names and identifiers may be determined from a persisted catalog log as described with respect to FIG. 4. According to the FIG. 4 example, the collection name "a" and the collection identifier "5" are determined for a single collection at S510.

Next, at S520, a number of partitions belonging to one of the collections is determined. This determination may also be based on the persisted catalog log. Continuing the present example, one partition is identified at S520 based on the catalog log of FIG. 4.

For each identified partition, a number of slices and a number of indexes are determined at S530. The numbers may be determined from a respective persisted partition log associated with each partition. The partition log for a partition may be identified in persistent memory based on a name of the partition specified in the catalog log. For example, the sole partition of collection "a" is identified as "partition_5" in the catalog log of FIG. 4, and this name is used to identify the corresponding partition log.

The entries of the identified partition log are read at S530 to determine slices and indices of the partition. The entries may include entries associated with transactions to create a slice or index with a given filename (e.g., "slice_5_1", "index_5_1"), as shown in FIG. 4, and may also include entries associated with transactions to delete a slice or index. The entries are read at S530 in order to determine currently-existing indices by taking into account any delete transactions of the partition log. According to some embodiments, a dictionary associated with the partition is also determined at S530 based on the entries of the partition log.

Figure 6:
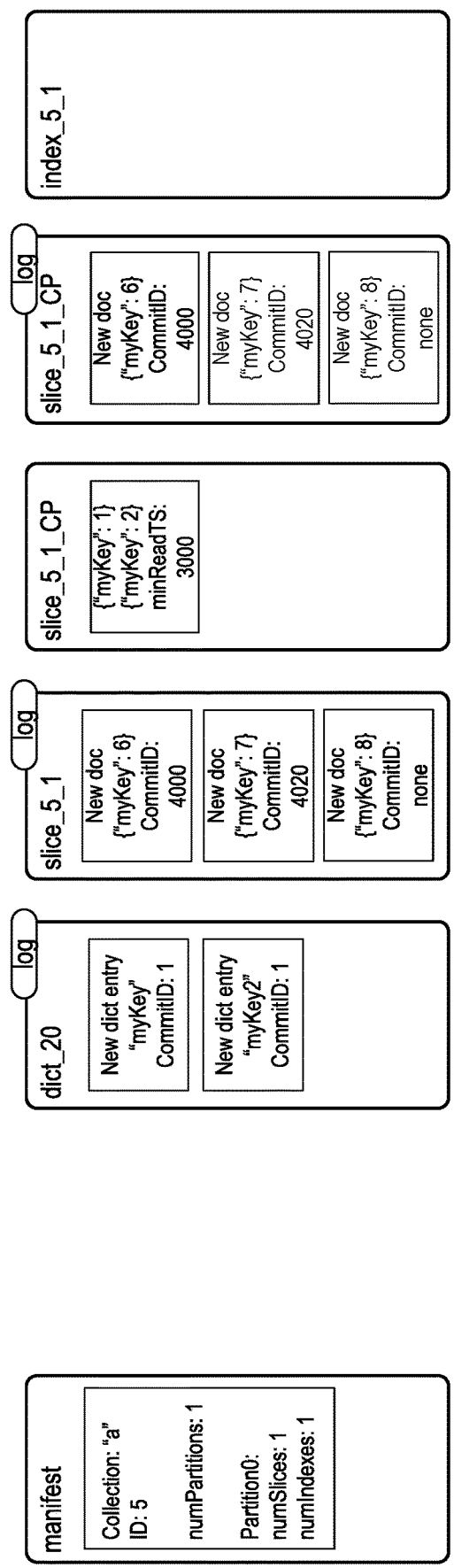
FIG. 6 represents exported files of a source document store according to some embodiments.

A manifest is generated at S540 including the determined collection name, collection identifier, number of partitions and number of indexes per partition. FIG. 6 illustrates a manifest file including the above information with respect to the source document store of FIG. 4. In some embodiments, some or all of the metadata determined at S510, S520 and S530 may be stored in a single location and determined therefrom.

Next, at S550, binary copies are generated of the persisted logs of each slice and each index, and of each persisted checkpoint and log, of the present collection. FIG. 6 also illustrates binary copies of the dictionary log, slice log, index log, checkpoint file and checkpoint log of FIG. 4. Generating binary copies may provide better performance and smaller files sizes than generating JSON files including corresponding string representations.

At S570, it is determined whether the document store includes additional collections. If so, flow returns to S520 to repeat S520, S530, S540 and S550 with respect to an additional collection. In such instances, the manifest may be updated at S540 instead of generating a new manifest for each collection. Once it is determined at S570 that no additional collections exist, flow proceeds to S570 to store the manifest and binary copies. The manifest and binary copies may be stored on the source document store, a target document store, or an intermediary system of any type.

Figure 7:
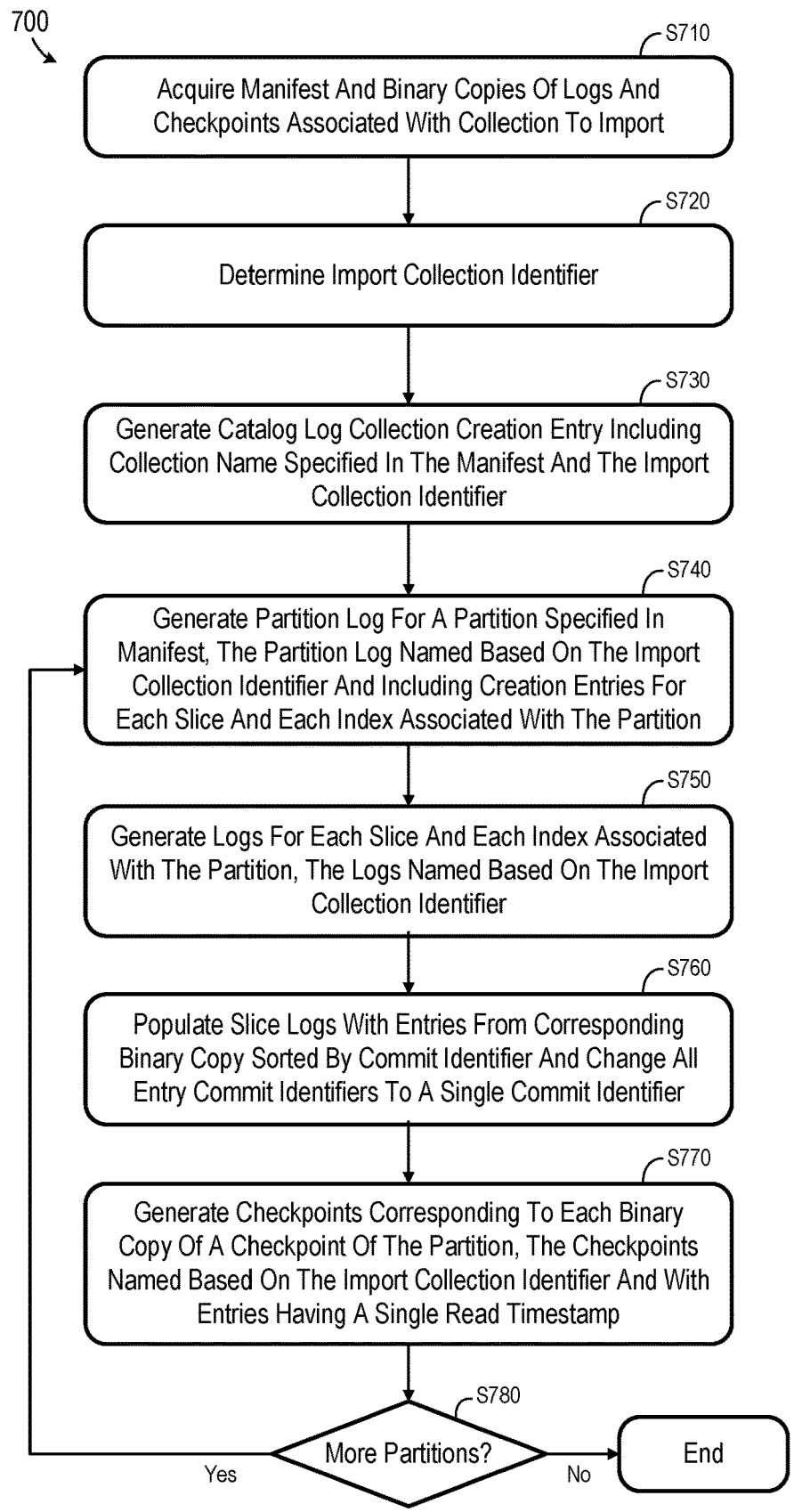
FIG. 7 is a flow diagram of a process to normalize exported files of a source document store according to some embodiments.

FIG. 7 is a diagram of a process to prepare an exported document store for import according to some embodiments. Process 700 may be executed by the source document store, a target document store, or an intermediary system such as, for example, normalization component 140 of FIG. 1. Process 700 will be described in the context of a single-collection document store, but embodiments are also compatible with multi-collection document stores.

Initially, at S710, a manifest and binary copies of files of a document store to import are acquired. The files may include, as described above, log files and checkpoint files. For purposes of the present description, it will be assumed that the files of FIG. 6 are acquired at S710.

An import collection identifier is determined at S720. With respect to the present example, the collection identifier specified in the manifest is "5". Since another collection having this identifier may exist in the target document store, an import collection identifier which does not yet exist in the target document store is determined at S720. In the present example, the import collection identifier is determined by adding a large constant, in this case 100, to the collection identifier. The import collection identifier is therefore determined as 105.

Figure 8:
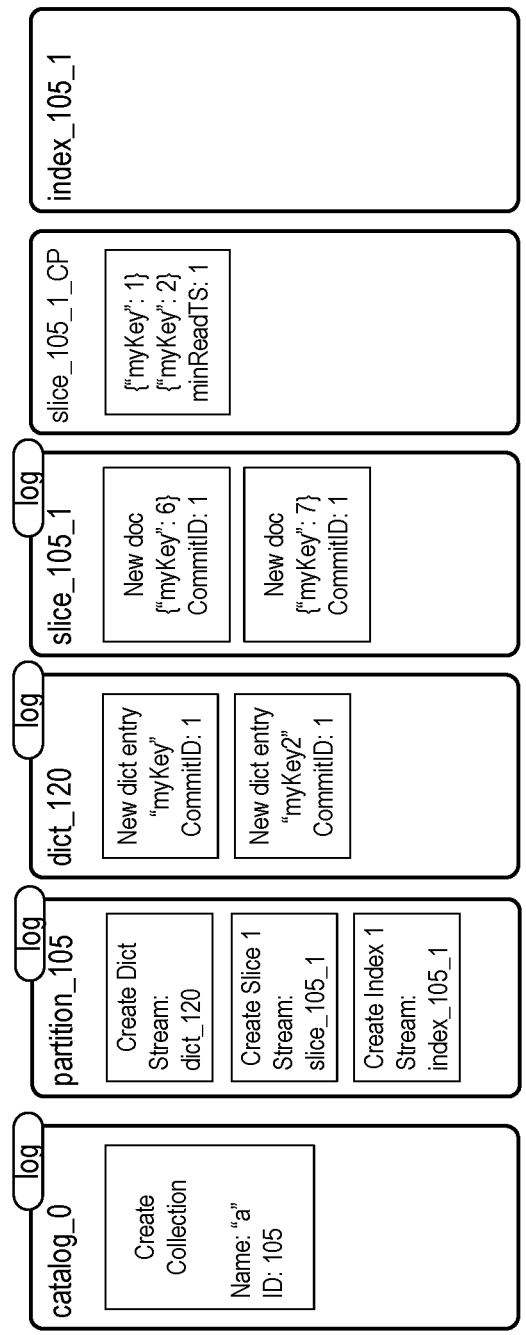
FIG. 8 represents normalized files of a source document store according to some embodiments.

A catalog log is generated at S730. The catalog log includes an entry associated with the creation of a collection. The entry includes the collection name specified in the manifest and the determined import collection identifier. FIG. 8 shows a catalog log including an entry according to an example of S730.

A partition log is generated at S740 for a partition specified in the manifest. The generated partition log is named based on the import collection identifier and includes creation entries associated with each slice and each index associated with the partition. The associated slices and indices are also determined based on the manifest.

Continuing the particular example, the manifest of FIG. 6 specifies a single partition including one slice and one index. Accordingly, the partition log of FIG. 8 includes entries associated with the creation of one slice and one index. The partition log is named based on the import collection identifier (i.e., "partition_105") in order to distinguish the name of the log from other potential partition logs of the target documents store. The entries of the partition log specify file names of the slice and index logs which are also associated with the import collection identifier. In the present example, the partition log also includes an entry associated with creation of a dictionary, but embodiments are not limited thereto.

At S750, logs are generated for each slice and for each index associated with the partition. These logs, as described with respect to S740, are also named based on the import collection identifier.

Any slice logs generated at S750 are populated with entries from the corresponding slice log binary copy acquired at S710. However, during the population, the entries are first sorted by commit identifier and then all entries are given a single commit identifier. The single commit identifier may be a low number (e.g. "1") so that all transactions of the slice log are visible to all transactions of the target document store. Commit identifiers may be determined consecutively, therefore "1" denotes the very first committed transaction. Accordingly, "1" is considered as a commit identifier identifying transactions that are visible to all other transactions.

Figure 9:
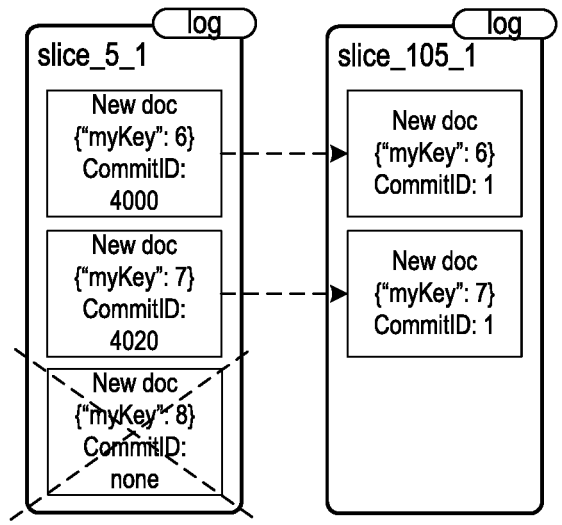
FIG. 9 illustrates generation of a normalized slice log file according to some embodiments.

FIG. 9 illustrates conversion of the slice log binary copy of FIG. 6 to a "normalized" slice log according to some embodiments of S750. The entry of the uncommitted transaction ("Commit ID: none") is deleted and the commit identifiers of the other entries are changed to "1". The sorting of the entries is unchanged because the entries are already ordered by commit identifiers in the binary copy.

Figure 10:
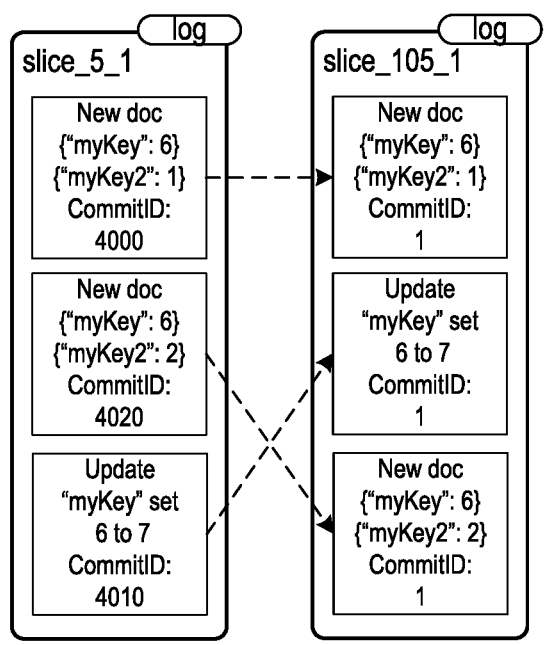
FIG. 10 illustrates generation of a normalized slice log file according to some embodiments.

In contrast, the left-hand side of FIG. 10 illustrates a binary copy of a slice log in which entries are not sorted by commit identifier. The dashed arrows illustrate re-ordering of the second and third entries to conform to the sorting order, prior to changing the commit identifiers of all entries to "1".

The reason for the ordering is as follows. Data Manipulation Language transactions occur in parallel, therefore new log entries are written virtually in parallel to the log file. Some of these entries will never be committed because, for example, transactions get aborted, or a serialization error may occur during online processing (i.e., two transactions attempt to modify the very same document virtually at the same time). The order in which transactions are committed is not identical to the order in which log entries are written to the log file. When replaying the log, e.g. after database restart, the log entries are ordered on-the-fly in memory by commit identifier to reflect the actual order in which data was committed. This ordering gets lost when all of the commit identifier are changed to "1" as described above, so ordering occurs as described herein before the commit identifiers are changed to "1".

Returning to process 700, checkpoints are then generated at S770 corresponding to each checkpoint binary copy of the partition. FIG. 8 shows a checkpoint and a log including the entries of the checkpoint and log of FIG. 6. However, in contrast to FIG. 6, the minimum read timestamp of each checkpoint document and the commit identifier of each log entry are changed to "1". As described with respect to S760, the entries of the checkpoint log binary copy are sorted based on their commit identifiers during generation of the "normalized" checkpoint log. The filenames of the checkpoint and checkpoint log are also changed to substitute the original identifier "5" with the import collection identifier "105".

Flow proceeds to S780 and returns to S740 if the collection includes additional partitions. Process 700 terminates after all partitions are processed according to S740 through S770. The generated files may then be imported into the filesystem of the target document store and accessed thereby.

Figure 11:
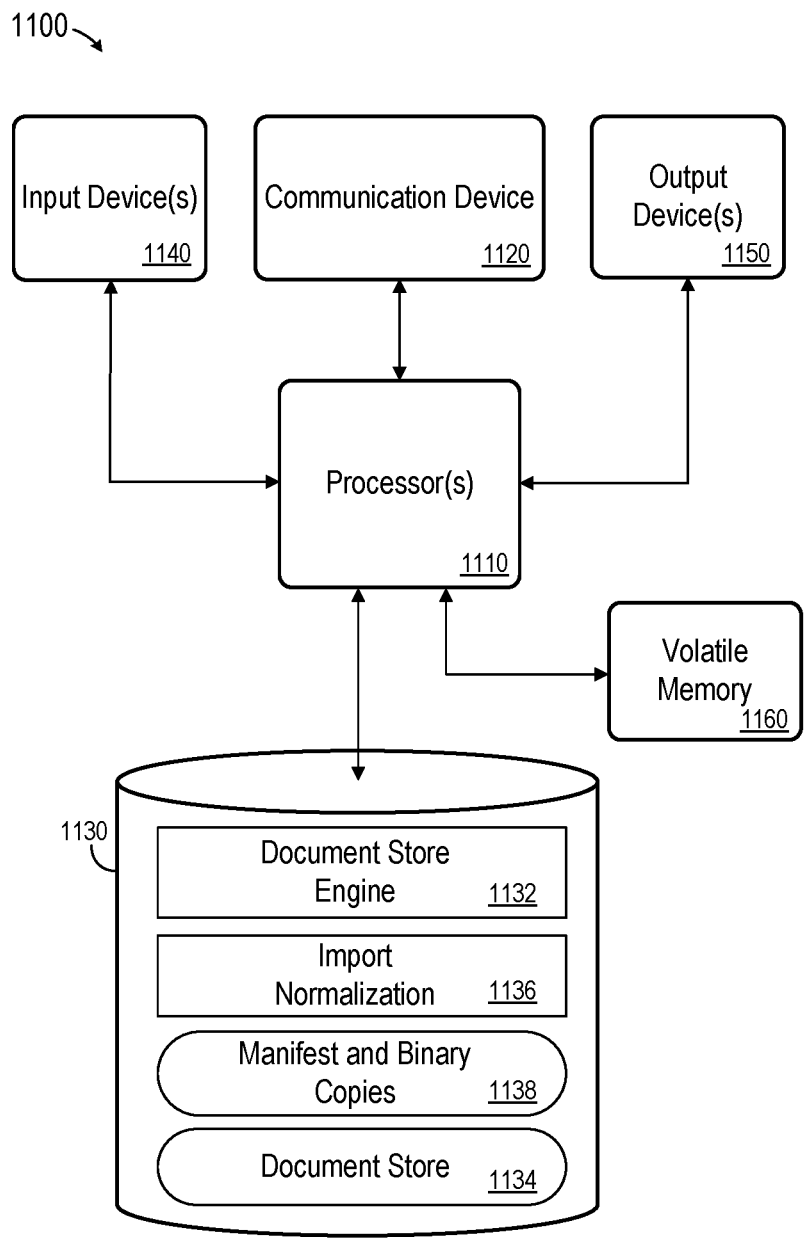
FIG. 11 is a diagram illustrating a computing system according to some embodiments.

FIG. 11 is a block diagram of apparatus 1100 according to some embodiments. Apparatus 1100 may comprise a general-purpose computing apparatus and may execute program code to perform any of the functions described herein. Apparatus 1100 may comprise an implementation of target document store 120 as described above. Apparatus 1100 may include other unshown elements according to some embodiments.

Apparatus 1100 includes processor(s) 1110 operatively coupled to communication device 1120, data storage device 1130, one or more input devices 1140, one or more output devices 1150 and memory 1160. Communication device 1120 may facilitate communication with external devices, such as a reporting client, a source document store, or an external data storage system. Input device(s) 1140 may comprise, for example, a keyboard, a keypad, a mouse or other pointing device, a microphone, knob or a switch, an infra-red (IR) port, a docking station, and/or a touchscreen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM), Storage Class Memory (SCM) or any other fast-access memory.

Document store engine 1132 may comprise program code to serve data from a document store such as document store 1134 as is known in the art. Processor(s) 1110 may execute program code of import normalization component 1136 to cause system 1100 to perform processes 700 and/or 500 as described above. In this regard, data storage device 1130 may include binary copies of log files and checkpoint files to be imported, as well as a manifest as described above. Embodiments are not limited to execution of these processes by a single apparatus.

Data storage device 1130 may also store data and other program code for providing additional functionality and/or which are necessary for operation of apparatus 1100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

As will be appreciated based on the foregoing description, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those in the art can be made to the disclosed embodiments without departing from the spirit and scope of the disclosure as set forth in the appended claims.

What is claimed is:

1. A computing system comprising:
   a memory system to store a manifest data file and a copy of a first document store slice log having a first filename and comprising a first plurality of entries, each of the first plurality of entries associated with a respective database transaction and a commit identifier, and the manifest data file indicating one or more data partitions and one or more slices of each of the one or more data partitions; and
   a processor to execute processor-executable program code to cause the computing system to:
      generate a first partition log for a first data partition of the indicated one or more data partitions, the generated first partition log comprising a first log entry associated with a transaction to create a first slice and including a second filename associated with the first slice;
      sort the first plurality of entries of the first document store slice log based on their associated commit identifiers;
      responsive to sorting the first plurality of entries, change the commit identifiers of each of the first plurality of entries of the first document store slice log to a same commit identifier; and
      store the sorted first plurality of entries of the first document store slice log, each of the sorted first plurality of entries associated with the same commit identifier, in a second document store slice log having the second filename.

2. The computing system according to claim 1, the memory system to store a copy of a third document store slice log having a third filename and comprising a second plurality of entries, each of the second plurality of entries associated with a respective database transaction and a commit identifier, the generated first partition log comprising a second log entry associated with a transaction to create a second slice and including a fourth filename associated with the second slice, and the processor to execute processor-executable program code to cause the computing system to:
   sort the second plurality of entries of the third document store slice log based on their associated commit identifiers;
   responsive to sorting the second plurality of entries, change the commit identifiers of each of the second plurality of entries of the third document store slice log to the same commit identifier; and
   store the sorted second plurality of entries of the third document store slice log, each of the sorted second plurality of entries associated with the same commit identifier, in a fourth document store slice log having the fourth filename.

3. The computing system according to claim 2, the memory system to store a copy of a fifth document store slice log having a fifth filename and comprising a third plurality of entries, each of the third plurality of entries associated with a respective database transaction and a commit identifier, and the processor to execute processor-executable program code to cause the computing system to:
   generate a second partition log for a second data partition of the indicated one or more data partitions, the generated second partition log comprising a third log entry associated with a transaction to create a third slice and including a sixth filename associated with the third slice;
   sort the third plurality of entries of the fifth document store slice log based on their associated commit identifiers;

responsive to storing the third plurality of entries, change the commit identifiers of each of the third plurality of entries of the fifth document store slice log to the same commit identifier; and store the sorted third plurality of entries of the fifth document store slice log, each of the sorted third plurality of entities associated with the same commit identifier, in a sixth document store slice log having the sixth filename.

4. The computing system according to claim 1, the memory system to store a copy of a third document store slice log having a third filename and comprising a second plurality of entries, each of the second plurality of entries associated with a respective database transaction and a commit identifier, and the processor to execute processor-executable program code to cause the computing system to:

generate a second partition log for a second data partition of the indicated one or more data partitions, the generated second partition log comprising a second log entry associated with a transaction to create a second slice and including a fourth filename associated with the second slice;

sort the second plurality of entries of the third document store slice log based on their associated commit identifiers;

responsive to sorting the second plurality of entries, change the commit identifiers of each of the second plurality of entries of the third document store slice log to the same commit identifier; and store the sorted second plurality of entries of the third document store slice log, each of the sorted second plurality of entries associated with the same commit identifier, in a fourth document store slice log having the fourth filename.

5. The computing system according to claim 1, the memory system to store a copy of a document store index, and to store the manifest data file indicating one or more data partitions, one or more slices of each of the one or more data partitions, and one or more indices of at least one of the one or more data partitions, and wherein the generated first partition log comprises a first log entry associated with a transaction to create a first index and including the second filename associated with the first index.

6. The computing system according to claim 1, the memory system to store a copy of a first slice checkpoint file associated with the first slice and including a first plurality of records, each of the first plurality of records associated with a first read timestamp, and acquire a first slice checkpoint log comprising a second plurality of entries, each of the second plurality of entries associated with a respective database transaction and a commit identifier, and the processor to execute processor-executable program code to cause the computing system to:

sort the second plurality of entries of the slice checkpoint log based on their associated commit identifiers;

responsive to sorting the second plurality of entries, change the commit identifiers of each of the second plurality of entries of the first slice checkpoint log to the same commit identifier;

store the sorted second plurality of entries of the first slice checkpoint log in a second slice checkpoint log;

change the read timestamps of each of the second plurality of entries of the first slice checkpoint file to a same read timestamp; and store the entries of the first slice checkpoint file in a second slice checkpoint file.

7. The computing system according to claim 6, the memory system to store a copy of a third slice checkpoint file associated with the first slice and including a second plurality of records, each of the second plurality of records of the third slice checkpoint file associated with a second read timestamp, and acquire a third slice checkpoint log comprising a third plurality of entries, each of the third plurality of entries associated with a respective database transaction and a commit identifier, and the processor to execute processor-executable program code to cause the computing system to:

sort the third plurality of entries of the third slice checkpoint log based on their associated commit identifiers;

responsive to sorting the third plurality of entries, change the commit identifiers of each of the third plurality of entries of the third slice checkpoint log to the same commit identifier;

store the sorted third plurality of entries of the third slice checkpoint log in a fourth slice checkpoint log;

change the read timestamps of each of the third plurality of entries of the third slice checkpoint file to a same read timestamp; and store the entries of the third slice checkpoint file in a fourth slice checkpoint file.

8. A method comprising:

acquiring a manifest data file and a copy of a first document store slice log having a first filename and comprising a first plurality of entries, each of the first plurality of entries associated with a respective database transaction and a commit identifier, and the manifest data file indicating one or more data partitions and one or more slices of each of the one or more data partitions;

generating a first partition log for a first data partition of the indicated one or more data partitions, the generated first partition log comprising a first log entry associated with a transaction to create a first slice and including a second filename associated with the first slice;

sorting the first plurality of entries of the first document store slice log based on their associated commit identifiers;

responsive to sorting the first plurality of entries, changing the commit identifiers of each of the first plurality of entries of the first document store slice log to a same commit identifier; and storing the sorted first plurality of entries of the first document store slice log, each of the sorted first plurality of entries associated with the same commit identifier, in a second document store slice log having the second filename.

9. The method according to claim 8, the generated first partition log comprising a second log entry associated with a transaction to create a second slice and including a fourth filename associated with the second slice, the method further comprising:

acquiring a copy of a third document store slice log having a third filename and comprising a second plurality of entries, each of the second plurality of entries associated with a respective database transaction and a commit identifier;

sorting the second plurality of entries of the third document store slice log based on their associated commit identifiers;

responsive to sorting the second plurality of entries, changing the commit identifiers of each of the second plurality of entries of the third document store slice log to the same commit identifier; and storing the sorted second plurality of entries of the third document store slice log, each of the sorted second plurality of entries associated with the same commit identifier, in a fourth document store slice log having the fourth filename.

10. The method according to claim 9, further comprising:
acquiring a copy of a fifth document store slice log having a fifth filename and comprising a third plurality of entries, each of the third plurality of entries associated with a respective database transaction and a commit identifier;
generating a second partition log for a second data partition of the indicated one or more data partitions, the generated second partition log comprising a third log entry associated with a transaction to create a third slice and including a sixth filename associated with the third slice;
sorting the third plurality of entries of the fifth document store slice log based on their associated commit identifiers;
responsive to storing the third plurality of entries, changing the commit identifiers of each of the third plurality of entries of the fifth document store slice log to the same commit identifier; and
storing the sorted third plurality of entries of the fifth document store slice log, each of the sorted third plurality of entities associated with the same commit identifier, in a sixth document store slice log having the sixth filename.

11. The method according to claim 8, further comprising:
acquiring a copy of a third document store slice log having a third filename and comprising a second plurality of entries, each of the second plurality of entries associated with a respective database transaction and a commit identifier;
generating a second partition log for a second data partition of the indicated one or more data partitions, the generated second partition log comprising a second log entry associated with a transaction to create a second slice and including a fourth filename associated with the second slice;
sorting the second plurality of entries of the third document store slice log based on their associated commit identifiers;
responsive to sorting the second plurality of entries, changing the commit identifiers of each of the second plurality of entries of the third document store slice log to the same commit identifier; and
storing the sorted second plurality of entries of the third document store slice log, each of the sorted second plurality of entries associated with the same commit identifier, in a fourth document store slice log having the fourth filename.

12. The method according to claim 8, the manifest data file indicating one or more data partitions, one or more slices of each of the one or more data partitions, and one or more indices of at least one of the one or more data partitions, the method further comprising:
storing a copy of a document store index,
wherein the generated first partition log comprises a first log entry associated with a transaction to create a first index and including the second filename associated with the first index.

13. The method according to claim 8, further comprising:
acquiring a copy of a first slice checkpoint file associated with the first slice and including a first plurality of records, each of the first plurality of records associated with a first read timestamp, and acquiring a first slice checkpoint log comprising a second plurality of entries, each of the second plurality of entries associated with a respective database transaction and a commit identifier;
sorting the second plurality of entries of the slice checkpoint log based on their associated commit identifiers;
responsive to sorting the second plurality of entries, changing the commit identifiers of each of the second plurality of entries of the first slice checkpoint log to the same commit identifier;
storing the sorted second plurality of entries of the first slice checkpoint log in a second slice checkpoint log;
changing the read timestamps of each of the second plurality of entries of the first slice checkpoint file to a same read timestamp; and
storing the entries of the first slice checkpoint file in a second slice checkpoint file.

14. The method according to claim 13, further comprising:
acquiring a copy of a third slice checkpoint file associated with the first slice and including a second plurality of records, each of the second plurality of records of the third slice checkpoint file associated with a second read timestamp, and acquiring a third slice checkpoint log comprising a third plurality of entries, each of the third plurality of entries associated with a respective database transaction and a commit identifier;
sorting the third plurality of entries of the third slice checkpoint log based on their associated commit identifiers;
responsive to sorting the third plurality of entries, changing the commit identifiers of each of the third plurality of entries of the third slice checkpoint log to the same commit identifier;
storing the sorted third plurality of entries of the third slice checkpoint log in a fourth slice checkpoint log;
changing the read timestamps of each of the third plurality of entries of the third slice checkpoint file to a same read timestamp; and
storing the entries of the third slice checkpoint file in a fourth slice checkpoint file.

15. A non-transitory computer-readable storage medium storing program code executable by a processor of a computing system to cause the computing system to:
acquire a manifest data file and a copy of a first document store slice log having a first filename and comprising a first plurality of entries, each of the first plurality of entries associated with a respective database transaction and a commit identifier, and the manifest data file indicating one or more data partitions and one or more slices of each of the one or more data partitions;
generate a first partition log for a first data partition of the indicated one or more data partitions, the generated first partition log comprising a first log entry associated with a transaction to create a first slice and including a second filename associated with the first slice;
sort the first plurality of entries of the first document store slice log based on their associated commit identifiers;
responsive to sorting the first plurality of entries, change the commit identifiers of each of the first plurality of entries of the first document store slice log to a same commit identifier; and
store the sorted first plurality of entries of the first document store slice log, each of the sorted first plurality of entries associated with the same commit identifier, in a second document store slice log having the second filename.

16. The medium according to claim 15, the program code executable by a processor of a computing system to cause the computing system to:
generate the first partition log comprising a second log entry associated with a transaction to create a second slice and including a fourth filename associated with the second slice, the method further comprising:
acquiring copy of a third document store slice log having a third filename and comprising a second plurality of entries, each of the second plurality of entries associated with a respective database transaction and a commit identifier;
sorting the second plurality of entries of the third document store slice log based on their associated commit identifiers;
responsive to sorting the second plurality of entries, changing the commit identifiers of each of the second plurality of entries of the third document store slice log to the same commit identifier; and
storing the sorted second plurality of entries of the third document store slice log, each of the sorted second plurality of entries associated with the same commit identifier, in a fourth document store slice log having the fourth filename.

17. The medium according to claim 16, the program code executable by a processor of a computing system to cause the computing system to:
acquire a copy of a fifth document store slice log having a fifth filename and comprising a third plurality of entries, each of the third plurality of entries associated with a respective database transaction and a commit identifier;
generate a second partition log for a second data partition of the indicated one or more data partitions, the generated second partition log comprising a third log entry associated with a transaction to create a third slice and including a sixth filename associated with the third slice;
sort the third plurality of entries of the fifth document store slice log based on their associated commit identifiers;
responsive to storing the third plurality of entries, change the commit identifiers of each of the third plurality of entries of the fifth document store slice log to the same commit identifier; and
store the sorted third plurality of entries of the fifth document store slice log, each of the sorted third plurality of entities associated with the same commit identifier, in a sixth document store slice log having the sixth filename.

18. The medium according to claim 15, the program code executable by a processor of a computing system to cause the computing system to:
acquire a copy of a third document store slice log having a third filename and comprising a second plurality of entries, each of the second plurality of entries associated with a respective database transaction and a commit identifier;
generate a second partition log for a second data partition of the indicated one or more data partitions, the generated second partition log comprising a second log entry associated with a transaction to create a second slice and including a fourth filename associated with the second slice;
sort the second plurality of entries of the third document store slice log based on their associated commit identifiers;
responsive to sorting the second plurality of entries, change the commit identifiers of each of the second plurality of entries of the third document store slice log to the same commit identifier; and
store the sorted second plurality of entries of the third document store slice log, each of the sorted second plurality of entries associated with the same commit identifier, in a fourth document store slice log having the fourth filename.

19. The medium according to claim 15, the manifest data file indicating one or more data partitions, one or more slices of each of the one or more data partitions, and one or more indices of at least one of the one or more data partitions, the program code executable by a processor of a computing system to cause the computing system to:
store a copy of a document store index,
wherein the generated first partition log comprises a first log entry associated with a transaction to create a first index and including the second filename associated with the first index.

20. The medium according to claim 15, wherein the acquired first document store slice log includes a first filename having a collection identifier; and
the program code executable by a processor of a computing system to cause the computing system to generate the first partition log for the first data partition of the indicated one or more data partitions, the generated first partition log comprising the first log entry associated with a transaction to create the first slice and including the second filename associated with the first slice, wherein the second filename is based on an import collection identifier that is combined with the collection identifier of the first filename.

* * * * *